United States Patent
Abe et al.

(10) Patent No.: US 6,380,551 B2
(45) Date of Patent: Apr. 30, 2002

(54) OPTICAL FUNCTION DEVICE WITH PHOTONIC BAND GAP AND/OR FILTERING CHARACTERISTICS

(75) Inventors: Takao Abe; Hiroji Aga, both of Annaka (JP)

(73) Assignee: Shin-Etsu Handotai Co., Ltd., Tokyo (JP)

(*) Notice: Subject to any disclaimer, the term of this patent is extended or adjusted under 35 U.S.C. 154(b) by 0 days.

(21) Appl. No.: 09/299,074

(22) Filed: Apr. 26, 1999

(30) Foreign Application Priority Data

May 1, 1998  (JP) ........................... 10-122556

(51) Int. Cl.[7] ............................. H01L 29/06
(52) U.S. Cl. .................. 257/15; 257/17; 257/18; 257/21; 257/22
(58) Field of Search .................. 257/14, 15, 17, 257/18, 21, 22

(56) References Cited

U.S. PATENT DOCUMENTS

| | | | |
|---|---|---|---|
| 5,254,830 A | 10/1993 | Zarowin et al. | 219/121.43 |
| 5,315,128 A | * 5/1994 | Hunt et al. | 257/16 |
| 5,374,564 A | 12/1994 | Bruel | 437/24 |
| 5,998,298 A | * 12/1999 | Fleming et al. | 257/17 |

OTHER PUBLICATIONS

Surface Science Technology Series 3, Science of Silicon, UCS (Jun. 28, 1996) pp. 459–466 ("Bonded SOI Substrate", pp. 465 "Section 3.2 Smart cut Technology" and Fig. 12 written by Kiyoshi Mitani).

Surface Science Technology Series 3, Science of Silicon, UCS (Jun. 28, 1996) pp. 459–466 ("Bonded SOI Substrate", pp. 459–469 "1. Manufacturing Method" and Fig. 1 written by Kiyoshi Mitani).

Surface Science Technology Series 3, Science of Silicon, UCS (Jun. 28, 1996) pp. 459–466 ("Bonded SOI Substrate", pp. 463–465 "3.1 PACE Technology" written by Kiyoshi Mitani).

* cited by examiner

Primary Examiner—Minh Loan Tran
(74) Attorney, Agent, or Firm—Arent Fox Kintner Plotkin & Kahn PLLC

(57) ABSTRACT

A stacked material free from a degraded quality of crystal, formed with a precise periodicity, and fabricated without relying on the vapor phase growth method is provided. An optical function device using the stacked material is also provided. A starting stacked material composed of two alternate layers (A), (B) having different refractive indexes is stacked over two periods or more by a substrate bonding method to provide a multi-periodic stacked structure.

32 Claims, 7 Drawing Sheets

OPTICAL FUNCTION DEVICE WITH PHOTONIC BAND GAP AND/OR FILTERING CHARACTERISTICS

BACKGROUND OF THE INVENTION

1. Field of the Invention

The present invention relates to a stacked material which exhibits a photonic band gap characteristic or a filtering characteristic and a light emitting characteristic, and an optical function device using the stacked material.

2. Description of the Related Art

The photonic band gap is a function for limiting the transmittance of light at a particular wavelength by periodically stacking two kinds of materials (A), (B) having different refractive indexes over two or more periods. For example, as illustrated in FIG. 1, the photonic band gap can be realized by periodically stacking a starting stacked structure composed of two layers (A), (B) having different refractive indexes over two or more periods on a substrate (C).

The filtering characteristic, on the other hand, is realized by inserting a layer region (D) having a different thickness from that of the layer (A) or the layer (B) into a portion of the stacked structure of the photonic band gap, for example, as illustrated in FIG. 3. This layer (D) is referred to as a "defective layer."

Since the energy width of the photonic band gap is proportional to a difference between refractive indexes of the layer (A) and the layer (B), it is important to stack materials which present a large difference between refractive indexes thereof, such as a semiconductor material (for example, a silicon layer or the like) and an insulating material (for example, a silicon oxide film, a silicon nitride film, an air layer or the like).

In general, a vapor phase growth method is used in many cases as a method of fabricating a stacked structure. The vapor phase growth method is most suitable also for growing a layer having a structure conforming to the crystal structure of the substrate (C). However, a stacked structure exhibiting the photonic band gap characteristic is composed of two layers having different crystal structures such as a semiconductor material and an insulating material or crystal and amorphous, so that it has been difficult to fabricate such a stacked structure by the vapor phase growth method while maintaining the planarity of the interface and the integrity of crystal structures.

As a specific example, the growth of a photonic band gap structure with a periodic stacked structure composed of two layers consisting of amorphous silicon and a silicon oxide film (amorphous) has been reported. The amorphous material, however, is not used in semiconductor devices except for solar cells. Therefore, this method may cause a problem when crystal silicon is required.

There is also a report on a photonic band gap structure which is composed of two compound semiconductor layers stacked over four periods. The compound semiconductor layers are each prepared by etching a surface of an epitaxially grown layer in a striped pattern to form periodically striping trapezoids. The two layers are rotated by 90 degrees with respect to each other and bonded. This structure yields a difference between refractive indexes of the atmosphere and the semiconductor stacked structure. However, since a heat treatment is used for bonding, the quality of crystal may be problematic. While several other examples have also been reported, all of them still leave unsolved problems of the quality of stacked crystal, the uniformity of periodic structure and so on.

OBJECT AND SUMMARY OF THE INVENTION

The present invention has been made in view of the problems inherent to the prior art stacked material, and its object is to provide a stacked material which is formed with a precise periodicity and fabricated without relying on the vapor phase growth method, and an optical function device using the stacking material.

To solve the problems mentioned above, a stacked material in accordance with the present invention is characterized by comprising a multi-periodic stacked structure fabricated by periodically stacking a starting stacked material composed of two alternate layers (A), (B) having different refractive indexes over two or more periods by a substrate bonding method. The stacked material of this structure has a photonic band gap characteristic in the thickness direction. The multi-periodic stacked structure is stacked on a substrate (C).

By including a non-periodic structure in the multi-periodic stacked structure, a stacked material having a filtering characteristic in the thickness direction can be provided.

The use of a smart cut method as the substrate bonding method is advantageous in that the stacked material can be more efficiently and more accurately fabricated.

By providing at least one layer of the multi-periodic stacked structure with a periodicity of different refractive indexes, for example, with a sequence of holes formed therethrough, a stacked material having a three-dimensional photonic band gap characteristic can be provided.

By partly including a non-periodic portion in the periodicity, for example, partly forming holes of the hole sequence at irregular intervals in the foregoing example, a stacking material having a three-dimensional filtering characteristic can be provided.

It is preferable to employ a structure in which the layer (A) is a silicon oxide film, the layer (B) is a silicon layer, and the substrate (C) is a silicon substrate.

It is also possible to employ a structure in which the layer (A) is a silicon layer, the layer (B) is a silicon oxide film, and the substrate (C) is a quartz substrate.

A silicon nitride film may be formed instead of the silicon oxide film.

A compound semiconductor layer may be formed instead of the silicon layer.

An optical function device can be fabricated using any of the stacked materials having a three-dimensional photonic band gap characteristic or a filtering characteristic as mentioned above. The optical function device may be a waveguide, an optical communication modulator, a photo-detector and so on.

By providing the non-periodic structure portion with a light emitting ability, for example, forming a region doped with a rare metal such as erbium (Er) or the like between a p-region and an n-region in a silicon layer, light emission is provided. It is therefore possible to provide an optical function device which extracts the light thus emitted as a laser.

A method of bonding substrates applied to the present invention can fabricate any stacked structure composed of not only a semiconductor layer and a semiconductor layer but also all substrates (for example, synthetic quartz and silicon or the like), as long as they have a good surface planarity.

DESCRIPTION OF THE PREFERRED EMBODIMENTS

The present invention will hereinafter be described in conjunction with its preferred embodiments with reference to the accompanying drawings. It goes without saying that the embodiments only shows preferred modes of the present invention and the present invention is not at all limited to such specific embodiments.

Figure 1:
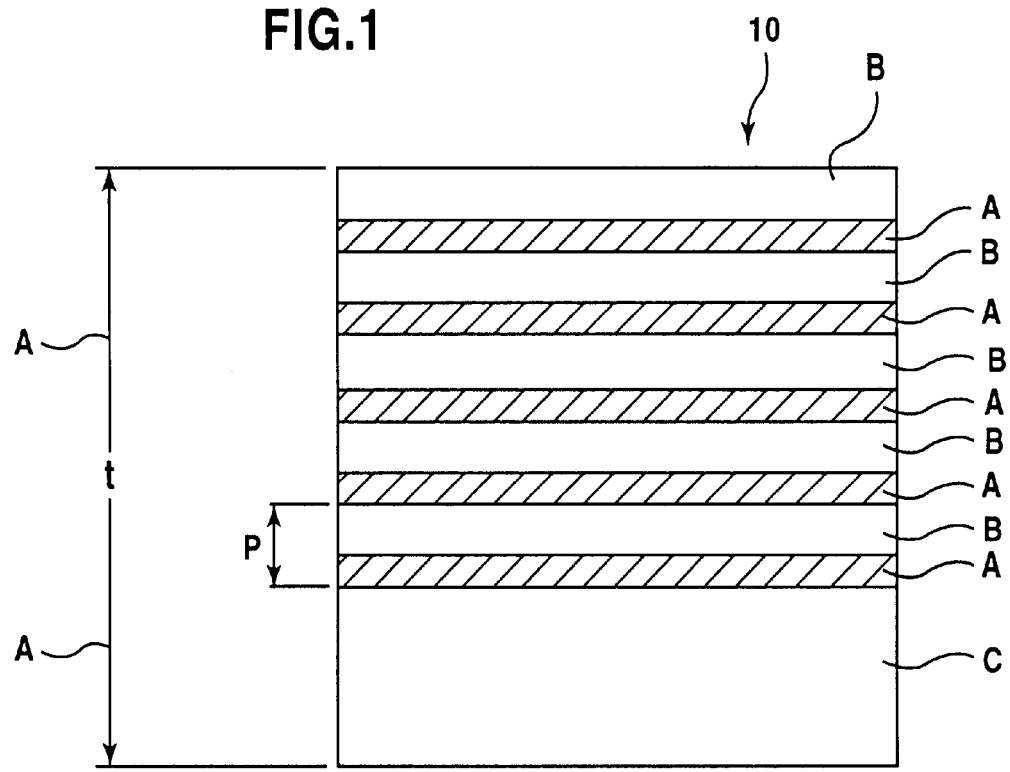
FIG. 1 is a cross-sectional view illustrating an example of a photonic band gap stacked structure in the thickness direction in accordance with the present invention.

Referring specifically to FIG. 1, there is shown a photonic band gap stacked structure, generally designated by reference numeral 10, and having a thickness extending in a thickness direction indicated by arrows A in a stacked material in accordance with the present invention. The stacked structure 10 has a substrate (C) on which two alternate layers (A), (B), having different refractive indexes from each other, are periodically stacked with a predetermined period (P) over two or more periods (five periods in the illustrated example).

Figure 2:
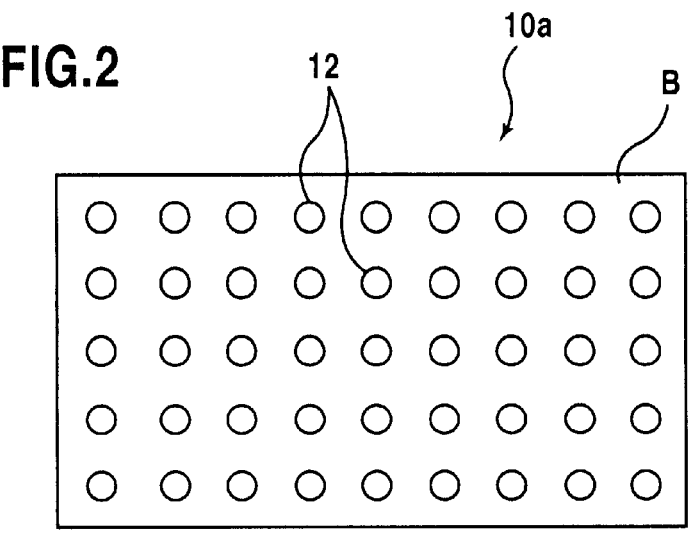
FIG. 2 is a top plan view illustrating a three-dimensional photonic band gap stacked structure fabricated by regularly forming a plurality of holes in a grid form arrangement through the photonic band gap stacked structure of FIG. 1.

Referring next to FIG. 2, a three-dimensional photonic band gap stacked structure, generally designated by reference numeral 10a, in the stacked material in accordance with the present invention is fabricated by periodically and regularly forming a plurality of holes 12 in a grid form arrangement through the photonic band gap stacked structure 10 in the thickness direction illustrated in FIG. 1. The holes 12 also may be formed from the surface of the stacked structure 10 to the middle thereof or only inside thereof.

Figure 3:
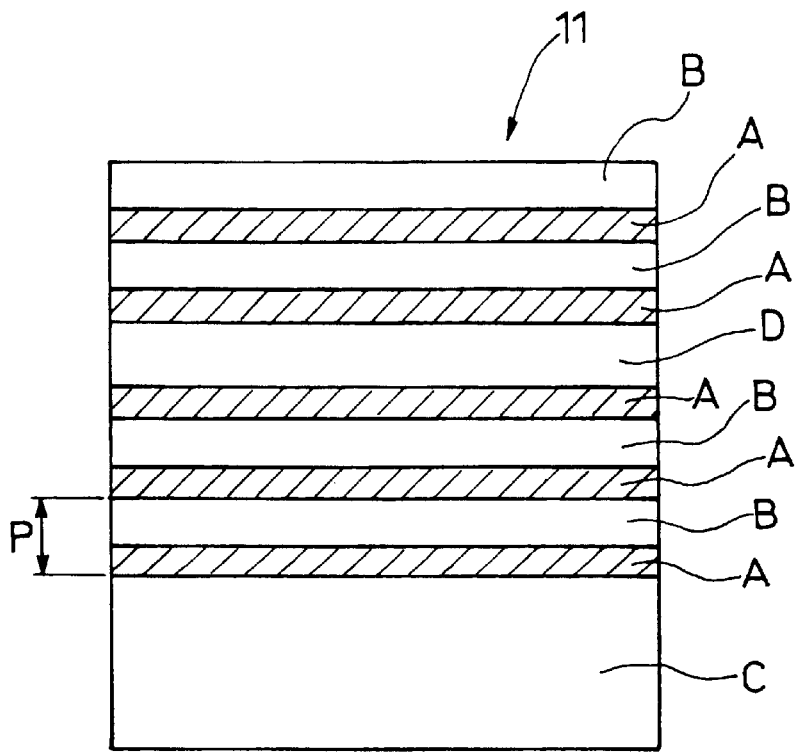
FIG. 3 is a cross-sectional view illustrating an example of a stacked structure having a filtering characteristic in the thickness direction.

Referring next to FIG. 3, a stacked structure, generally designated by reference numeral 11, has a filtering characteristic in the thickness direction in the stacked material in accordance with the present invention. The stacked structure 11 has a substrate (C) on which two alternate layers (A), (B), having different refractive indexes from each other, are periodically stacked with a predetermined period (P) over two or more periods, as is the case of the aforementioned stacked structure 10. The stacked structure 11, however, differs from the stacked structure 10 in that a layer (D) having a thickness different from that of the layer (A) or the layer (B) is inserted in a portion of the stacked structure 11, and that a non-periodicity is partly included in the stacked structure 11.

Figure 4:
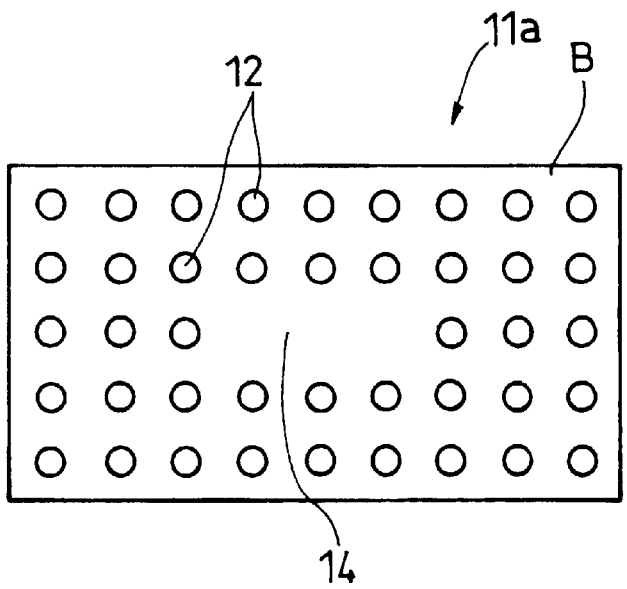
FIG. 4 is a top plan view illustrating a stacked structure having a three-dimensional filtering characteristic which is fabricated by regularly forming a plurality of holes in a grid form arrangement through the photonic band gap stacked structure having a filtering characteristic of FIG. 3 and including partly an irregular portion in the grid form arrangement.

Referring next to FIG. 4, a stacked structure, generally designated by reference numeral 11a, has a three-dimensional filtering characteristic in the stacked material in accordance with the present invention. For fabricating the stacked structure 11a, a plurality of holes 12 are periodically and regularly formed in a grid form arrangement through the stacked structure 11 having the filter structure in the thickness direction illustrated in FIG. 3 and a non-periodic portion or an irregular portion (a portion without holes which is referred to as a "cavity") 14 is included in a portion of the grid form arrangement. The holes 12 also may be formed from the surface of the stacked structure 11 to the middle thereof or only inside thereof.

The foregoing structures result in the formation of a device which has non-periodicity respectively in the longitudinal direction and the lateral direction in FIG. 4 which provides a two-dimensional filtering action for transmitting light at a particular wavelength in both directions that is added to a filtering action in the thickness direction (a direction normal to the sheet) of light to achieve a three-dimensional filter action.

Figure 5:
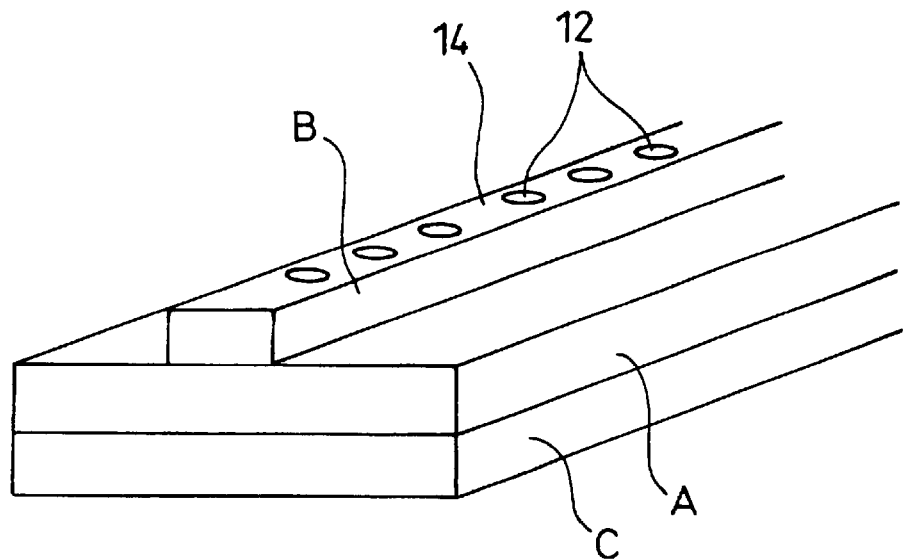
FIG. 5 is a perspective view illustrating an example of a waveguide structure which is formed by fabricating a layer (A) and a layer (B) on a substrate (C), forming a plurality of holes through the layer (B) in one direction, and including an irregular portion in a sequence of holes.

The stacked structure having the filtering characteristic will be described in greater detail with reference to FIGS. 5 and 6. A stacked structure illustrated in FIG. 5 is formed by fabricating a layer (A) and a layer (B) alternately on a substrate (C) and periodically forming a plurality of holes 12 through the layer (B) in one direction with a non-periodic portion or an irregular portion (a portion without holes, i.e., a cavity) 14. In this case, light of a particular wavelength only is permitted to transmit the layer (B) in the one direction.

Figure 6:
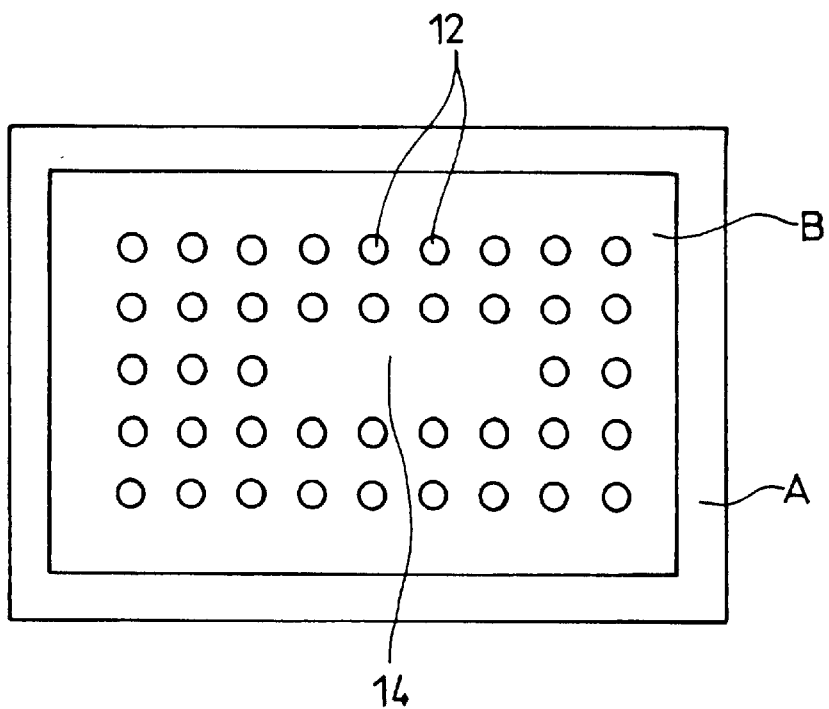
FIG. 6 is a top plan view illustrating a structure formed by fabricating a layer (B) on a layer (A), forming the layer (B) with a plurality of holes in two directions, and including partly an irregular portion.

When the layer (B) is formed with a plurality of periodically arranged holes 12 in two directions with a non-periodic portion or an irregular portion (a portion without holes, i.e., a cavity) 14, as illustrated in FIG. 6, light of a particular wavelength only is permitted to transmit the layer (B) in the two directions.

Taking advantage of this phenomenon, the foregoing structure is useful as a waveguide and provides a filtering effect which only transmits light of a particular wavelength.

Figure 7:
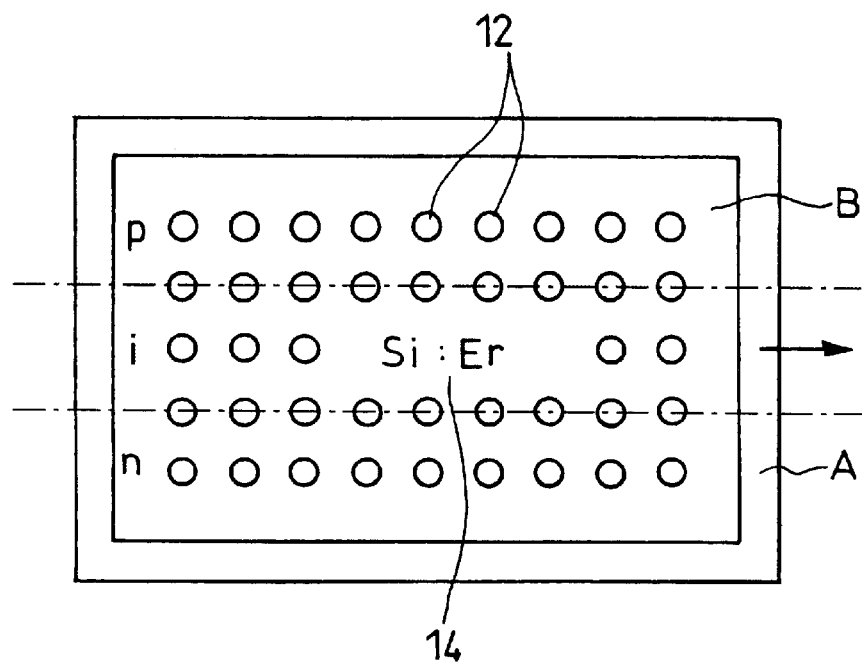
FIG. 7 is a top plan view illustrating an example of an optical function device in accordance with the present invention.
Figure 8:
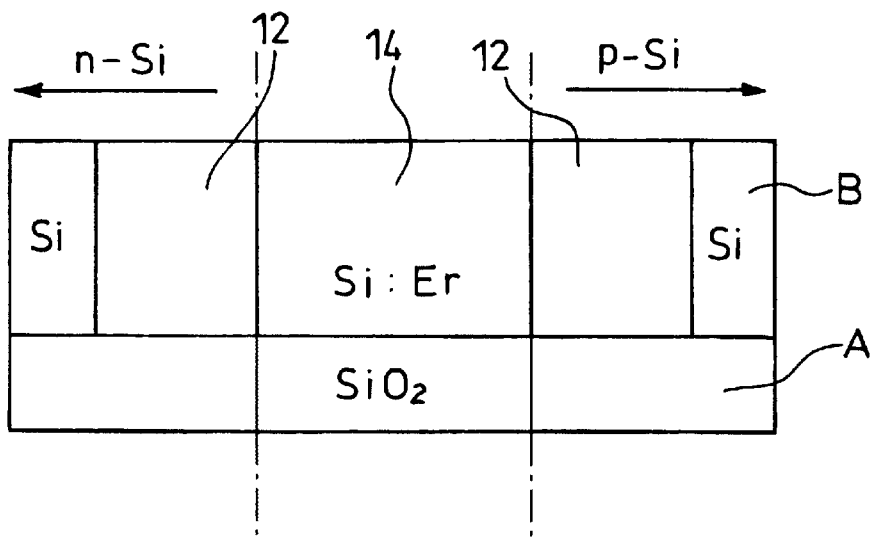
FIG. 8 is an enlarged and partly cross-sectional view illustrating a portion of FIG. 7.

Referring next to FIG. 7, the layer (B) (more specifically, a non-periodic structure portion (cavity) of the silicon layer) is doped with a rare metal such as erbium (Er) to form a pin (p-i-n) junction structure in the longitudinal direction. Then, a voltage applied in the longitudinal direction causes emission of light which may be extracted as a laser, for example, in a direction indicated by the arrow in FIG. 7.

Although this structure provides only for a light emitting feature, a light receiving feature is required for achieving optical communications. For this reason, SiGe crystal may be formed in a circuit for a light receiving area by selective epitaxial growth to provide a feature for transducing an optical signal to an electrical signal.

By incorporating the features providing the foregoing actions into a current LSI chip, distribution of optical communications to and interactive communications with users (homes) can be implemented with a one-chip device, as a first application. In addition, since the foregoing features solve a delay in signal propagation due to metal wiring which is the largest limitation of current LSIs, the present invention provides inestimable effects.

Further, the use of optical coupling in a conventional IC chip will result in faster performance and reduction in size, as well as afford right angle bending which does not require a curvature for bending light, leading to distribution of light over a wide angle and an improved reliability. The present invention can be applied to devices such as an optical communication modulator, a filter light detector, a laser, and so on, other than the aforementioned waveguide.

While any materials presenting a large difference between refractive indexes thereof may be used for the layers (A), (B), the following combinations may be preferably used: (1) a silicon oxide film for the layer (A), a silicon layer for the layer (B), and a silicon substrate for the substrate (C); or (2) a silicon layer for the layer (A), a silicon oxide film for the layer (B), and a quartz substrate for the substrate (C). A silicon nitride film may be used instead of the silicon oxide film, while a compound semiconductor layer may be used instead of the silicon layer, so that a variety of stacking materials can be provided by combining these materials.

For forming a variety of stacked structures mentioned above, a substrate bonding method may be applied. A procedure of the substrate bonding method will be described below for an exemplary case where a silicon single crystal wafer is used as a substrate.

First, an oxide film is formed on a flat surface of a silicon single crystal wafer, and then another flat silicon single crystal wafer is brought into contact with the former wafer such that the surfaces thereof face each other. This causes Van der Waals' forces to act between the two substrates to completely bond them.

In this event, by heating the substrates, for example, to 800° C.–1100° C., the bonding can be promoted. Subsequently, the silicon substrate (A) is mechanically polished to a thickness of approximately 0.5 μm (etching may also be performed as required). Then, the polished surface is bonded to the substrate (B), and the substrate (B) is polished (and etched as required) to a required thickness. In this way, one period of the stacked structure is completed.

Subsequently, the foregoing steps are repeated to form the alternate layers (A), (B) until a required number of periods (P) is reached. In this way, layers having different refractive indexes can be bonded in the thickness direction over a required number of periods to complete the stacked structure 10 that has a photonic band gap characteristic (see FIG. 1). A heat treatment(s) may be added as required to improve the bonding strength.

Alternatively, after stacked structures each comprising several layers are separately formed, the two stacked structures may be bonded to form a predetermined periodic structure.

Furthermore, the three-dimensional photonic band gap stacked structure 10a may be fabricated by regularly forming a plurality of holes 12 in a grid form arrangement through this stacked structure, so that the refractive index is periodically changed between the Si layer and an air layer even within the Si layer (FIG. 2).

The stacked structure 11 having the filtering characteristic can be realized by changing the thickness of the layer (A) or (B) at need in the vicinity of one half of the total number of periods in a process of stacking the alternate layers (A), (B) in a similar manner. This layer (D), having the changed thickness different from the thickness of the layer (A) or (B), is referred to as a "defective layer" since it disturbs the periodicity (FIG. 3).

The stacked structure 11a (FIG. 4) having a three-dimensional filtering characteristic can be fabricated by regularly forming a plurality of holes 12 in a grid form arrangement through the stacked structure 11, and including partly an irregular portion (a portion without holes, i.e., a cavity) 14 in the grid form arrangement of holes.

In addition, it is also possible to provide a filtering characteristic in plane (two-dimensional) directions for a particular layer, for example, by regularly forming holes in the layer (A) in the second period of the stacked structure, as illustrated in FIG. 4, forming a cavity in a portion thereof, and then repeating the next bonding process.

The use of a smart cut method as a substrate bonding method in the present invention provides for elimination of the step of removing the substrate by polishing and a significant improvement in the thickness of the layer and the uniformity thereof, thereby making it possible to realize a highly accurate device.

The smart cut method refers to a method disclosed in Japanese Patent Laid-open Publication No. 5-211128 or U.S. Pat. No. 5,374,564 which can be applied to manufacturing of a thin film made of a semiconductor material. More specifically, this is a method of manufacturing a thin film made of a semiconductor material, which is characterized by processing, in the following three steps, a semiconductor material wafer which has a surface substantially parallel with a main crystal face of a semiconductor material when it is perfectly monocrystalline, and slightly inclined with respect to a main crystal face of the same index for all grains when the semiconductor material is polycrystalline: (a) a first step of implanting to form a layer of micro-bubbles for confining a lower area constituting a substrate bulk and an upper area constituting a thin film in the wafer bulk into a depth thereof close to an average penetration depth of ions through bombardment into a surface of the wafer performed by ions, wherein the ions are selected from hydrogen gas ions or rare gas ions and the temperature of the wafer during the implantation is maintained lower than a temperature which a gas produced by the ion implantation can emit from the semiconductor through diffusion; (b) a second step of closely contacting the flat surface of the wafer to a reinforcing member made of at least one rigid material; and (c) a third step of heat treating an assembly of the wafer and the reinforcing member at a temperature higher than the temperature of the ion bombardment and suitable for separating (splitting, destacking) the thin film and the substrate bulk through a rearrangement action of crystal within the wafer and a pressure action within the micro-bubbles while maintaining the close contact between the reinforcing member and the flat surface of the wafer during this step.

Figure 9:
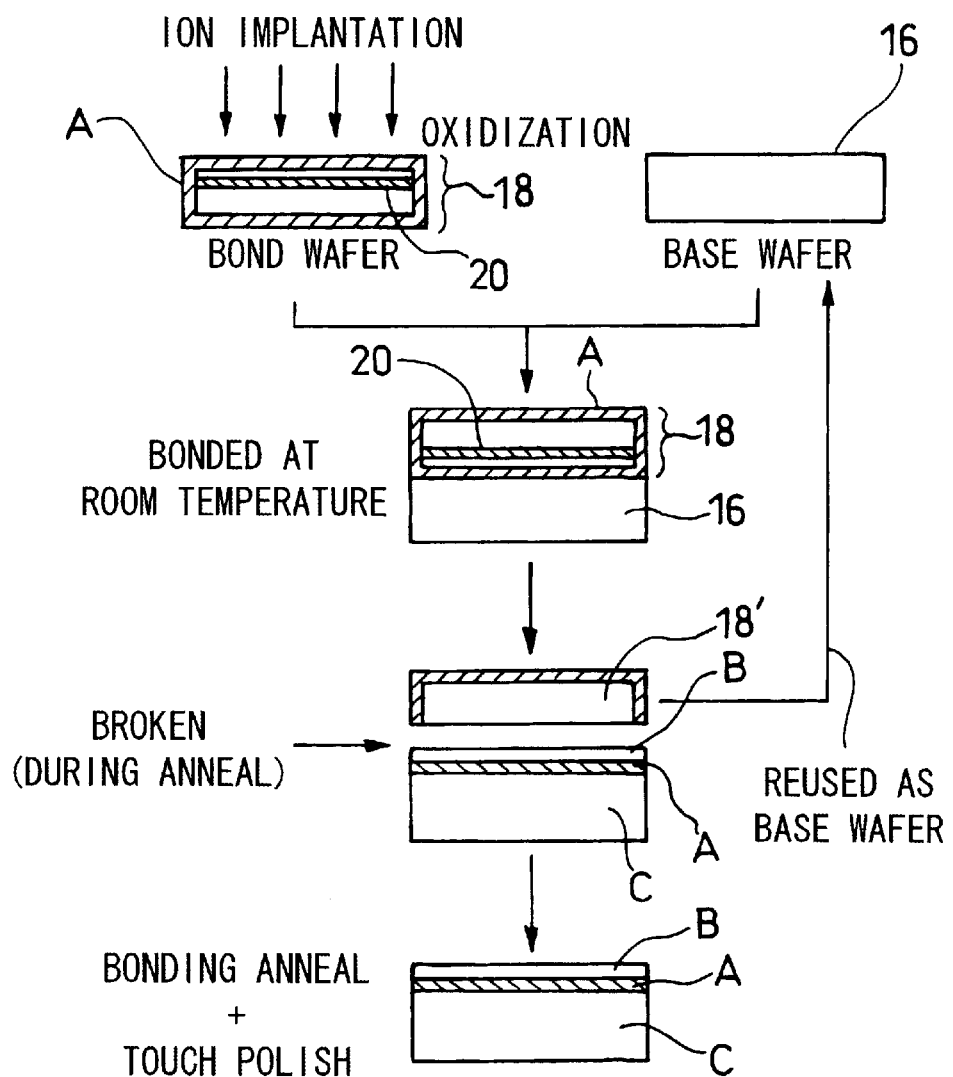
FIG. 9 is a flow diagram illustrating a procedure of fabricating a stacked structure in accordance with a smart cut method.

A procedure of fabricating a stacked structure in accordance with the substrate bonding using the smart cut method will be described below with reference to FIG. 9 which illustrates the steps involved in the procedure (see "Science of Silicon" edited by UCS Ultra Clean Society, and published by Kabushiki Kaisha Realize on Jun. 28, 1996, pp459–466 "Bonded SOI Substrate", pp465 "Section 3.2 Smart Cut Technology" and FIG. 12 written by Kiyoshi Mitani). Before bonding, light element ions (hydrogen ions or the like) are ion implanted into a bond wafer 18 having an oxide film (A) formed on a surface due to thermal oxidization, and the bond wafer 18 is bonded to a base wafer 16 at a room temperature. In a subsequent bonding anneal step, the wafer is split due to distortion from a portion 20 into which the ion was implanted to form a layer (A) (a silicon oxide film) and a layer (B) (a silicon layer) on a substrate (C) (the base wafer 16).

In this way, one period of the stacked structure is completed. While the surface of the layer (B) needs to be slightly polished, the thickness of the layer (B) depends upon the depth of the ion implantation, so that the thickness can be freely set. Since the other piece 18' of the bond wafer 18 peeled off during the anneal can be reused as the base wafer 16, the manufacturing cost can be reduced. After completing the one period of stacked structure, the aforementioned steps are repeated until a required number of periods of the alternate layers (A), (B) is reached.

Thus, layers having different refractive indexes can be bonded in the thickness direction, as is the case of the aforementioned substrate bonding method, thereby making it possible to fabricate the photonic band gap stacked structures 10, 10a and the stacked structures 11, 11a having the filtering characteristic in a similar manner.

Figure 10:
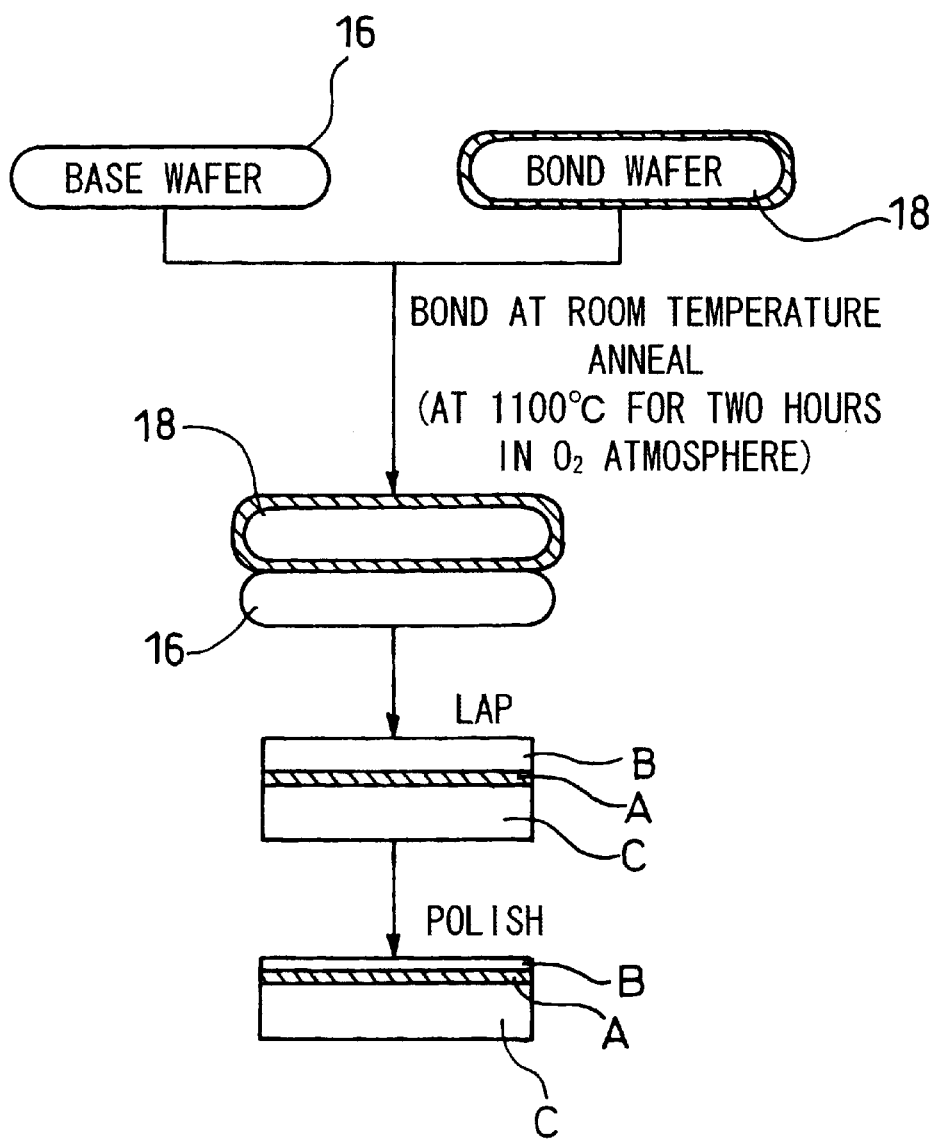
FIG. 10 is a flow diagram illustrating a procedure of fabricating a stacked structure in accordance with a substrate bonding method.

Other than the method described above, a method illustrated in FIG. 10 may be employed as a substrate bonding method applicable to the present invention (see "Science of Silicon" edited by UCS Ultra Clean Society, and published by Kabushiki Kaisha Realize on Jun. 28, 1996, pp459–466, "Bonded SOI Substrate", pp459–469"1. Manufacturing Method" and FIG. 1 written by Kiyoshi Mitani). Referring specifically to FIG. 10, first an unoxidized silicon wafer is provided as a substrate wafer (base wafer) 16 and is bonded to a wafer (bond wafer) 18 which has been oxidized in a required thickness at a room temperature.

After bonding, the wafers are annealed at a temperature equal to or higher than 800° C. for ensuring a higher bonding strength. Generally, the anneal is performed at 1100° C. for two hours in an oxygen atmosphere. The oxidized portion of the bond wafer 18 is thinned to a predetermined thickness through lapping and polishing. Thus, one period of a stacked structure is completed.

Subsequently, the foregoing steps are repeated until a required number of periods of the alternate layers (A), (B) is reached. In addition, a PACE (Plasma Assisted Chemical Etching) method may also be applied to improve the uniformity of the thickness. This method involves chemical etching of silicon, and a specific procedure of the PACE method is described in Japanese Patent No. 2565617 or U.S. Pat. No. 5,254,830.

More specifically, the PACE method is directed to a system for removing a material from a semiconductor wafer, which comprises means for determining thickness profile data for a semiconductor wafer, means for generating a dwell time versus position map derived from the thickness profile data, and means for removing a material from the semiconductor wafer, where the material removing means is controlled in accordance with the dwell time versus position map, and includes a plasma chemical etching chamber having a platform for accepting the semiconductor wafer, means for producing in the chamber a confined plasma having a smaller etching footprint than a thickness changing region to be removed, and means for controlling a dwell time and position of the plasma in accordance with the dwell time versus position map (see Japanese Patent No. 2565617 and "Science of Silicon" edited by UCS Ultra Clean Society, and published by Kabushiki Kaisha Realize on Jun. 28, 1996, pp459–466, "Bonded SOI Substrate" and pp463–465 "3.1 PACE Technology" written by Kiyoshi Mitani).

Next, the present invention will be described in more specific manner with reference to practical examples. It goes without saying that these examples only illustrate preferred specific implementation of the present invention, and it should not be construed that the present invention is limited to these specific examples.

EXAMPLE 1

A 150 mm-diameter normal p-type silicon wafer (having a thickness of 625 $\mu$m and a resistivity of 10 $\Omega$cm±2 $\Omega$cm) was used. First, this silicon wafer was oxidized to form an oxide film in thickness of 400 nm on the surface and was used as a bond wafer.

The bond wafer was implanted with a hydrogen ion at an accelerating voltage of 60 keV (doping amount is $5 \times 10^{16}/$cm$^2$). The position that exhibits the highest concentration of the hydrogen ion implanted through the 400 nm oxide film is located at 220 nm from the interface between the silicon and the oxide film. This bond wafer was bonded to a silicon wafer (base wafer) of a similar specifications without oxide film at a room temperature, and thermally treated at 500° C. for 30 minutes, causing the 400 nm oxide film and 220 nm silicon layer to be transferred to the base wafer due to destacking.

Since the destacked surface was rough in a microscopic view, it was planarized by RTA (rapid thermal anneal). However, since large periodic roughness still remained, touch polish was subsequently performed in a range of 0.03 to 0.05 $\mu$m. The first stacking was completed at this time. Afterward, the foregoing operations were repeated two times to form a three-layer structure.

Figure 11:
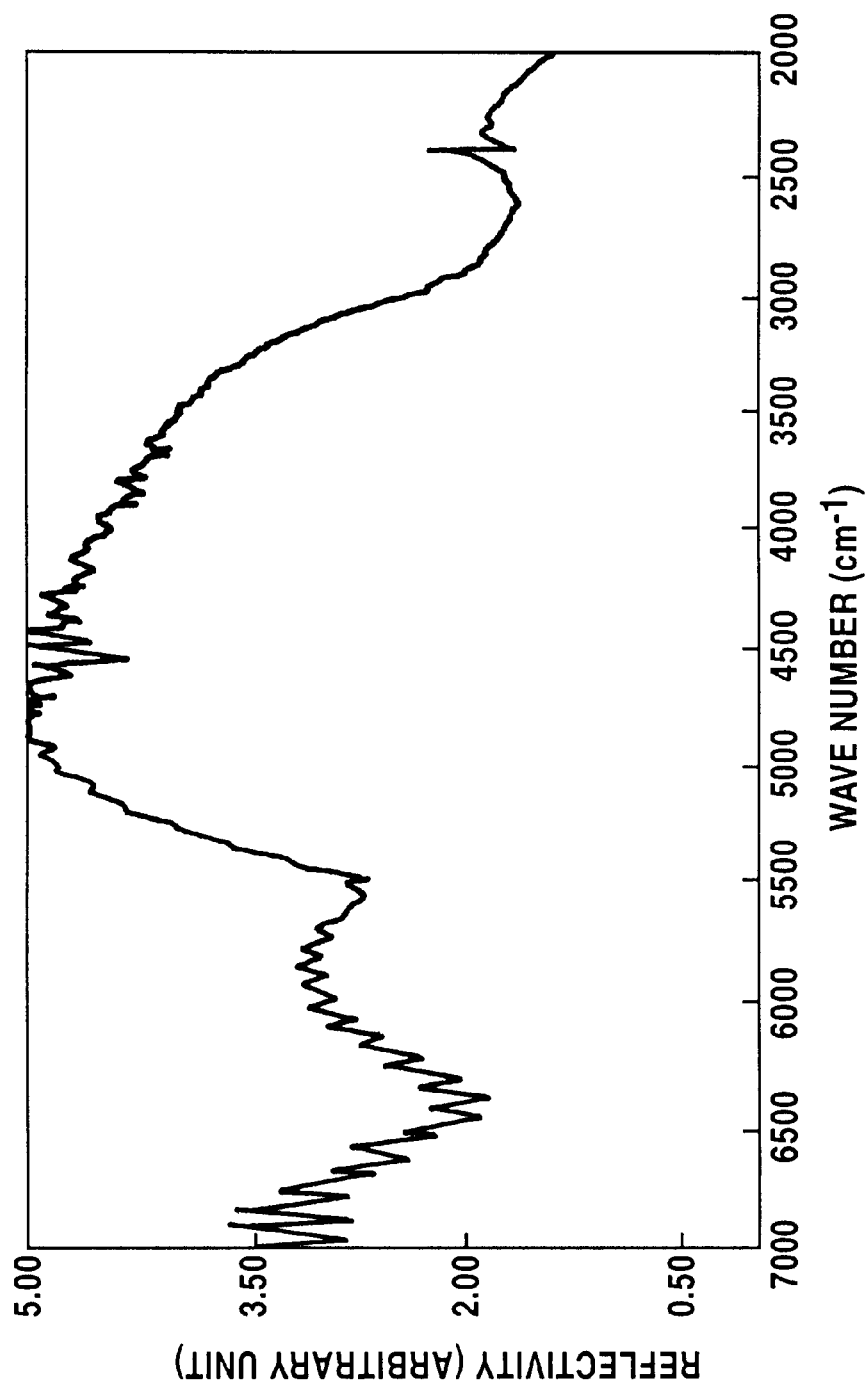
FIG. 11 is a graph illustrating the infrared spectrum of a stacked structure fabricated in Example 1.

It was confirmed through an infrared spectrum analysis whether a PBG (photonic band gap) phenomenon had occurred in the stacked structure composed of three repetitions of the two layers. FIG. 11 illustrates the result. As is apparent from FIG. 11, it can confirm that the PBG phenomenon has occurred.

EXAMPLES 2–4

An insulating layer (A) and a silicon layer (B) were stacked alternately on a silicon substrate (C) several times to fabricate a photonic band gap structure in the thickness direction.

The silicon layer had a thickness of 400 nm, while the insulating layer also had a thickness of 400 nm, and these alternate layers were stacked five times, i.e., the number of periods was five. A silicon oxide film (Example 2) or a silicon nitride film (Example 3) was used as the insulating layer. When light was directed to the stacked structure from a direction perpendicular thereto to measure a transmission characteristic, the stacked structure exhibited the transmittance of zero over a wavelength band ranging from one to two microns, with the silicon oxide film (example 2), thus confirming that a photonic band gap structure is provided.

It was also confirmed that with the silicon nitride film (Example 3), the photonic band gap characteristic was exhibited over substantially a similar wavelength range. Similarly, it was confirmed that a structure composed of a quartz substrate (C), silicon layers (A) and insulating layers (B) (Example 4) also exhibited the same characteristic.

EXAMPLES 5 and 6

An insulating layer (A) and a compound semiconductor layer (B) were stacked alternately on a silicon substrate (C) several times to fabricate a photonic band gap structure in the thickness direction.

The compound semiconductor layer had a thickness of 400 nm, while the insulating layer also had a thickness of 400 nm, and these alternate layers were stacked five times, i.e., the number of periods was five. GaAs was used as the compound semiconductor layer. A silicon oxide film (Example 5) or a silicon nitride film (Example 6) was used as the insulating layer. It was confirmed that the stacked structure exhibited the transmittance of zero over a wavelength band ranging from one to two microns, when the silicon oxide film was used (Example 5), and accordingly a photonic band gap structure was provided. It was also confirmed that with the silicon nitride film (Example 6), the photonic band gap characteristic was exhibited over substantially a similar wavelength range.

EXAMPLES 7–11

Holes were formed at regular intervals through each of the stacked structures described above in Examples 2–6. The holes had a diameter of 400 nm and were formed at intervals of 800 nm. It was confirmed that the transmittance was zero over a wavelength band ranging from one to two microns with respect to the light transmission characteristic in the in-plane direction of the stacked structure. As a result, a three-dimensional photonic band gap can be realized in the stacked structure which exhibits the transmittance of zero over this wavelength band when light is incident on the stacked structure from any direction.

As described above, the stacked material in accordance with the present invention is advantageous in that it is free from a degraded quality of crystal, formed with a precise periodicity, fabricated without relying on the vapor phase growth method, and utilized as an optical function device. Also advantageously, the optical function device in accordance with the present invention is highly usefully applied to a waveguide, an optical communication modulator, a light detector, a laser and so on.

Obviously various minor changes and modifications of the present invention are possible in the light of the above teaching. It is therefore to be understood that within the scope of the appended claims the invention may be practiced otherwise than as specifically described.

What is claimed is:

1. A stacked material comprising a multi-periodic stacked structure fabricated by stacking two alternate homogeneous layers (A), (B) of material having different refractive indexes, the stacked structure being stacked over two or more periods, wherein at least one layer in said multi-periodic stacked structure has a periodicity of different refractive indexes, said at least one layer having a periodicity including a non-periodic portion.

2. A stacked material according to claim 1 wherein said multi-periodic stacked structure is stacked on a substrate (C).

3. A stacked material according to claim 2, wherein said layer (A) is a silicon oxide film, said layer (B) is a silicon layer, and said substrate (C) is a silicon substrate.

4. A stacked material according to claim 2, wherein said layer (A) is a silicon layer, said layer (B) is a silicon oxide film, and said substrate (C) is a quartz substrate.

5. A stacked material according to claim 4, wherein said layer (A) is a compound semiconductor layer, said layer (B) is a silicon oxide film, and said substrate (C) is a quartz substrate.

6. A stacked material according to claim 2, wherein said layer (A) is a silicon nitride film said layer (B) is a silicon layer, and said substrate (C) is a silicon substrate.

7. A stacked material according to claim 6, wherein said layer (A) is a silicon nitride film, said layer (B) is a compound semiconductor layer and substrate (C) is a silicon substrate.

8. A stacked material according to claim 2, wherein said layer (A) is a silicon layer, said layer (B) is a silicon nitride film, and said substrate (C) is a quartz substrate.

9. A stacked material according to claim 8, wherein said layer (A) a compound semiconductor layer, said layer (B) is a silicon nitride film and said substrate (C) is a quartz substrate.

10. A stacked material according to claim 2, wherein said layer (A) is a silicon oxide film, said layer (B) is a compound semiconductor layer, and said substrate (C) is a silicon substrate.

11. A stacked material according to claim 1, wherein said multi-periodic stacked structure includes a non-periodic structure portion.

12. A stacked material according to claim 11, wherein said non-periodic portion is provided with a light emitting ability.

13. A stacked material according to claim 12, wherein said light emitting ability is realized by doping said at least one layer with a rare metal element.

14. An optical function device having a light emitting ability fabricated by using a stacked material according to claim 12.

15. A stacked material according to claim 11, wherein said stacked material has a filtering characteristic in a thickness direction.

16. A stacked material according to claim 1, wherein said layer (A) is a silicon oxide film and said layer (B) is a silicon layer.

17. A stacked material according to claim 1, wherein said layer (A) is a silicon layer and said layer (B) is a silicon oxide film.

18. A stacked material according to claim 1, wherein said layer (A) is a silicon nitride film and said layer (B) is a silicon layer.

19. A stacked material according to claim 1, wherein said layer (A) is a silicon layer and said layer (B) is a silicon nitride film.

20. A stacked material according to claim 1, wherein said layer (A) is a silicon oxide film and said layer (B) is a compound semiconductor layer.

21. A stacked material according to claim 1, wherein said layer (A) is a compound semiconductor layer and said layer (B) is a silicon oxide film.

22. A stacked material according to claim 1, wherein said layer (A) is a silicon nitride and said layer (B) is a compound semiconductor layer.

23. A stacked material according to claim 1, wherein said layer (A) is a compound semiconductor layer and said layer (B) is a nitride film.

24. A stacked material according to claim 1, wherein said stacked material has a photonic band gap characteristic in a thickness direction.

25. An optical function device fabricated by using a stacked material according to claim 24.

26. An optical function device according to claim 25, wherein said optical function device is a waveguide, an optical communication modulator or a light detector.

27. A stacked material according to claim 1, wherein said stacked material has a three-dimensional photonic band gap characteristic.

28. A stacked material according to claim 1, wherein said stacked material has a three-dimensional filtering characteristic.

29. A stacked material comprising a multi-periodic stacked structure fabricated by stacking two alternate homogeneous layers (A), (B) of material having different refractive indexes, the stacked structure being stacked over two or more periods, wherein at least one layer in said multi-periodic stacked structure has a periodicity of different refractive indexes and a periodic structure in said at least one layer is formed of a sequence of holes.

30. A stacked material according to claim 29, wherein said sequence of holes in said periodic structure includes a non-periodic portion.

31. A stacked material comprising a multi-periodic stacked structure fabricated by stacking two alternate homogeneous layers (A), (B) of material having different refractive indexes, the stacked structure being stacked over two or more periods, wherein said multi-periodic stacked structure includes a non-periodic structure portion, provided with a light-emitting ability being realized by doping at least one layer with a rare metal element.

32. A stacked material according to claim 31, wherein said rare metal element is erbium.

* * * * *